UNITED STATES PATENT OFFICE.

ADOLF FEER, OF MÜLHAUSEN, GERMANY.

STABLE DIAZO COMPOUND.

SPECIFICATION forming part of Letters Patent No. 582,853, dated May 18, 1897.

Application filed October 5, 1894. Serial No. 524,967. (Specimens.)

*To all whom it may concern:*

Be it known that I, ADOLF FEER, a citizen of Switzerland, residing at Mülhausen, Alsace, Germany, have made a useful Improvement in Dyeing and Printing with Diazo Compounds, of which the following is a specification.

Generally ingrained azo colors are obtained by padding yarn or cloth with an alkaline solution of beta-naphthol, drying and passing in a solution of diazo salts, or printing with the same mixed with a convenient thickening. These diazo salts are prepared by dissolving the aromatic amins in an acid and adding nitrite of sodium in a very low temperature. The diazo solution is unstable and must be prepared in the presence of ice thoroughly cold during all the time of the process.

The improvement which I have realized consists in the preparation and application of stable diazo salts which can be preserved indefinitely in a solid form and can be used without any ice or nitrite of sodium. The ordinary diazo salts, as hydrochlorates, sulfates, and nitrates, are not sufficiently stable and are explosive.

I have observed that a certain number of organic acids—viz., the carboxylic, sulfonic, and disulfonic acids of aromatic hydrocarbons and of the derivatives of the latter, phenyl-sulfuric acid and the homologues of the same—form, with the aromatic diazo compounds, stable salts which can be preserved in a dry state without any danger. These salts are prepared by adding simply the ordinary diazo salts (hydrochlorates, sulfates, &c.) to the salts of the above-named acids and drying at about 30° to 40° centigrade.

The most important of the salts alluded to above are, first, disulfonaphthalate of paranitrodiazobenzene; second, monosulfonaphthalate of diazodianisidin; third, monosulfonaphthalate of diazonaphthalene; fourth, disulfonaphthalate of diazoamidoazotoluene.

For the production of the first I dissolve 13.8 kilograms of paranitranilin in 13.8 kilograms of concentrated sulfuric acid (66° Baumé) and two hundred liters of water. I add seven kilograms of nitrite of soda, the liquid being kept thoroughly cold. This solution is poured on seventeen kilograms of dry disulfonaphthalate of sodium, and by this way the disulfonaphthalate of paranitrodiazobenzene is formed according to the following formula:

$$(C_6H_4NO_2N=N)_2SO_4 + C_{10}H_6(SO_3Na)_2 = Na_2SO_4 - (C_6H_4NO_2N=N)_2C_{10}H_6(SO_3)_2.$$

The paste is dried at a temperature of 30° to 40° centigrade. The disulfonaphthalate of paranitrodiazobenzene thus obtained constitutes a yellow crystallized stable salt, soluble in water and alcohol, insoluble in benzene. If heated, it is decomposed with development of gas. By mixing its solution with a solution of beta-naphtholate of sodium a red azo dye is produced. In a similar way the other salts are obtained.

For dyeing it is only necessary to dissolve the above-named salts, to add acetate of soda, and to pass the first with naphthol-prepared cloth or yarn in the solution thus obtained.

For printing I mix the solid diazo salts with a convenient thickening, (starch or tragacanth, &c.,) and I print in the ordinary way on cloth prepared with naphtholate of sodium.

Having thus particularly described my invention and the manner in which the same is to be carried out, what I claim is—

1. The process for the production of new compounds for dyeing and printing, which consists in combining one molecule of a sulfo-acid of an aromatic hydrocarbon with one molecule of the diazo derivative of an aromatic amido compound, as described.

2. The process for the production of new compounds for dyeing and printing which consists in combining one molecule of a di-sulfo-acid of naphthalene with one molecule of the diazo derivative of an aromatic amido compound as described.

3. The process for the production of a new compound for dyeing and printing, which consists in combining one molecule of naphthalene disulfo-acid with the diazo derivative of paranitranilin, as described.

4. As a new article of manufacture, the described disulfonaphthalate of paranitrodiazobenzene, which constitutes a yellow, crystallized stable salt, soluble in water and alcohol, insoluble in benzene, which can be preserved in a dry state without any danger, decomposes on heating with development of gas, and produces by giving its solutions in contact with beta-naphtholate of sodium a red coloring-matter.

5. The method of dyeing and printing yarns, cloths and like fabrics, which consists in first padding the fabric with an alkaline solution of beta-naphthol, and then applying to said prepared fabric a solution of a salt obtained by combining one molecule of a sulfo-acid of an aromatic hydrocarbon with one molecule of the diazo derivative of an aromatic amido compound, substantially as set forth.

In witness whereof I have hereunto signed my name in the presence of the subscribing witnesses.

ADOLF FEER.

Witnesses:
GEORGE GIFFORD,
F. E. CROME,
AMAND RITTER.